United States Patent [19]

Martin

[11] Patent Number: 5,712,660
[45] Date of Patent: Jan. 27, 1998

[54] CURSOR CONTROL STICK

[75] Inventor: Michael M. Martin, Seal Beach, Calif.

[73] Assignee: Canon Business Machines, Inc., Costa Mesa, Calif.

[21] Appl. No.: 545,160

[22] Filed: Oct. 19, 1995

[51] Int. Cl.$^6$ ............................................. G09G 5/08
[52] U.S. Cl. ......................... 345/161; 345/160; 200/6 A; 74/471 XY
[58] Field of Search ..................................... 345/160, 161, 345/156, 157, 168; 200/6 A, 5 A, 5 R; 74/471 XY; 341/22, 34; 361/680, 686

[56] References Cited

U.S. PATENT DOCUMENTS

| | | | |
|---|---|---|---|
| 4,493,219 | 1/1985 | Sharp et al. | 73/862.05 |
| 4,501,939 | 2/1985 | Hyltin et al. | 200/6 A |
| 4,680,577 | 7/1987 | Straayer et al. | 340/711 |
| 4,825,019 | 4/1989 | Fisher | 200/6 A |
| 5,034,574 | 7/1991 | Martovitz | 200/6 A |
| 5,231,386 | 7/1993 | Brandenburg et al. | 340/709 |
| 5,252,821 | 10/1993 | Sugimura | 345/161 |
| 5,252,971 | 10/1993 | Franz et al. | 341/26 |
| 5,269,004 | 12/1993 | Comerford et al. | 395/275 |
| 5,308,936 | 5/1994 | Biggs et al. | 178/18 |
| 5,341,154 | 8/1994 | Bird | 345/167 |
| 5,510,810 | 4/1996 | Nishijima et al. | 345/161 |
| 5,541,622 | 7/1996 | Engle et al. | 345/161 |
| 5,555,004 | 9/1996 | Ono et al. | 345/161 |

OTHER PUBLICATIONS

*Research Disclosure*, "Depth/Force Capability for Pointing Stick Devices", Oct. 1992, #34258, p. 769.

*Primary Examiner*—Dennis-Doon Chow
*Attorney, Agent, or Firm*—Fitzpatrick, Cella, Harper & Scinto

[57] ABSTRACT

A cursor control stick includes a rigid tube having an outwardly-tapering conical throughbore and horizontal protrusions at its base, and a plunger having an outwardly-tapering conical body shaped in correspondence with the throughbore. The plunger slidably fits inside the rigid tube and includes a neck which extends beyond the rigid tube and which is adapted to be manipulated by the user. Electrically-conductive biasing means is disposed beneath and in contact with the plunger, and pressure sensitive resistive material is disposed beneath and in contact with the horizontal protrusions. A base containing electrical circuitry is disposed beneath both the electrically-conductive biasing means and the pressure sensitive resistive material. The plunger is manipulable by the user between a depressed position and an undepressed position such that in the undepressed position the conical body of the plunger engages the conical throughbore of the rigid tube, and in the depressed position the conical body disengages the conical throughbore as the plunger moves downwardly inside the rigid tube. In response to a lateral force applied to the plunger in the undepressed position, the horizontal protrusions deform the pressure sensitive resistive material to complete an electric circuit which signals movement of the cursor on the computer screen. In the depressed position, the electrically-conductive biasing means is deformed so that the electrically-conductive biasing means contacts the base containing electrical circuitry and completes an electric circuit thereon which signals selection of an item on the computer screen.

11 Claims, 5 Drawing Sheets

CURSOR CONTROL STICK

BACKGROUND OF THE INVENTION

1. Field of the Invention

The present invention relates to a cursor control stick which, upon application of a lateral force, moves a cursor on a computer screen, and which, upon application of a downward force, selects a point on the computer screen, the cursor control stick utilizing an outwardly-tapering plunger slidably fit within an outwardly-tapering throughbore in order to reduce cursor movement on the computer screen caused by lateral force inadvertently applied when a point on the computer screen is selected.

2. Description of the Related Art

To date, several different types of devices have been incorporated into a modern laptop computer to manipulate a cursor on the computer's screen and to select a position on the computer's screen. Two such devices are an eraserhead and a character key.

A character key is a key on a computer keyboard which also controls a cursor's motion on the computer's screen. Using such a character key, a user can control the cursor's motion by applying lateral force to the character key in a direction of desired cursor movement, and can generate a character on the computer screen by applying downward force. Usually, the "J" key or the "F" key is used to move the cursor, since both are easily accessed from the normal typing position by a user's forefinger.

Because the above-described character keys have dual functionality, i.e., a key which moves a cursor on a computer screen also functions as a character key on a keyboard, errors often occur when typing. For example, inadvertent application of lateral force to the character key when typing can cause unwanted cursor movement on the computer screen.

The problem of cursor movement caused by inadvertently-applied lateral force is also faced by conventional eraserheads. An eraserhead is a cursor control stick, usually positioned on a computer keyboard between the "G", "H" and "B" keys, with which a user can control cursor movement on the computer screen by applying lateral force. Some conventional eraserheads also permit a user to select a point on the computer screen, i.e., to set the cursor at a specific point on the computer screen, by applying downward force to the eraserhead. In this type of eraserhead, if a user unwittingly applies a lateral force to the eraserhead when setting the cursor, unwanted cursor movement on the computer screen will occur. As a result, it is difficult, using a conventional eraserhead, to select a point on a computer screen accurately.

Some computer manufacturers have addressed the foregoing problem of unwanted cursor movement during cursor selection by using a software algorithm. However, such solutions are often very complex and greatly increase the cost of a keyboard.

Thus, there exists a need for a cursor control stick which enables a user to manipulate a cursor on a computer screen and to select a point on the computer screen, and which reduces lateral cursor movement during selection without greatly increasing the complexity and cost of a computer system using the cursor control stick.

SUMMARY OF THE INVENTION

The present invention addresses the foregoing need by providing a cursor control stick which moves a cursor on a computer screen in both X and Y directions in response to a laterally applied force, which selects a point on the computer screen in response to a downwardly applied force, and which reduces cursor movement on the computer screen caused by inadvertently-applied lateral force during selection of the point on the computer screen.

According to one aspect, the present invention is a cursor control stick adapted to be manipulated by a user to move a cursor on a computer screen by applying lateral force to the cursor control stick in a direction of desired cursor movement. The cursor control stick enables the user to select items on the computer screen at a position of the cursor by depressing a plunger on the cursor control stick. The cursor control stick includes a rigid tube having an outwardly-tapering conical throughbore and horizontal protrusions at a base of the rigid tube, and a plunger having an outwardly-tapering conical body shaped in correspondence with the throughbore of the rigid tube. The plunger slidably fits inside the rigid tube and includes a neck which extends beyond the rigid tube and which is adapted to be manipulated by the user. Electrically-conductive biasing means is disposed beneath and in contact with the plunger, and pressure sensitive resistive material is disposed beneath and in contact with the horizontal protrusions at the base of the rigid tube. A base containing electrical circuitry is disposed beneath both the electrically-conductive biasing means and the pressure sensitive resistive material. The plunger is manipulable by the user between a depressed position and an undepressed position such that in the undepressed position the conical body of the plunger engages the conical throughbore of the rigid tube, and in the depressed position the conical body of the plunger disengages the conical throughbore of the rigid tube as the plunger moves downwardly inside the rigid tube. In response to a lateral force applied to the plunger in the undepressed position, the horizontal protrusions at the base of the rigid tube deform the pressure sensitive resistive material to complete an electric circuit on the base which signals movement of the cursor on the computer screen. In the depressed position, the electrically-conductive biasing means is deformed so that the electrically-conductive biasing means contacts the base containing electrical circuitry and completes an electric circuit thereon which signals selection of an item on the computer screen.

Advantageously, when the plunger is in a depressed position, a gap is created between the plunger and the conical throughbore. Thus, when lateral force is inadvertently applied to the plunger when the plunger is in a depressed position, the plunger will move laterally inside of the gap, without contacting the conical throughbore. Accordingly, no lateral force is transferred to the horizontal protrusions, and thus no lateral cursor movement of the cursor results. In this manner, the present invention reduces the effects of inadvertently-applied lateral force during selection of a point on a computer screen.

According to another aspect, the present invention is a cursor control stick adapted to be manipulated by a user to move a cursor on a computer screen by applying lateral force to the cursor control stick in a direction of desired cursor movement, and which enables the user to select items on the computer screen at a position of the cursor by depressing a plunger on the cursor control stick. The cursor control stick includes a rigid tube having an outwardly-tapering conical throughbore, and a plunger having an outwardly-tapering conical body shaped in correspondence with the throughbore of the rigid tube. The plunger slidably fits inside the rigid tube and includes a neck which extends beyond the rigid tube and which is adapted to be manipulated by the user. Electrically-conductive biasing means is disposed beneath and in contact with the plunger, strain gauges are disposed radially around and in contact with the rigid tube, and a base containing electrical circuitry is disposed beneath the electrically-conductive biasing means and radially around and in contact with the strain gauges. The plunger is manipulable by the user between a depressed position and an undepressed position such that in the undepressed position, the conical body of the plunger engages the conical throughbore of the rigid tube, and in the depressed position the conical body of the plunger disengages the conical throughbore of the rigid tube as the plunger moves downwardly inside the rigid tube. In response to a lateral force applied to the plunger in the undepressed position, the lateral force is transferred from the plunger to the strain gauges which forcibly strain to complete an electrical circuit on the base containing electrical circuitry, thereby signalling movement of the cursor on the computer screen. In the depressed position, the electrically-conductive biasing means is deformed so that the electrically-conductive biasing means contacts the base containing electrical circuitry and completes an electric circuit on the base which signals selection of an item on the computer screen.

By utilizing a conically-shaped plunger and a conically-shaped throughbore, the foregoing cursor control stick reduces the effects of inadvertently-applied lateral force during cursor selection. More specifically, as described above, since a gap is created when the plunger moves slidably downward through the throughbore, the plunger will move inside the gap when lateral force is inadvertently applied to the plunger when the plunger is in a depressed position. Thus, a predetermined amount of lateral force is not transmitted to the strain gauges. As a result, more accurate cursor selection is possible.

According to still another aspect, the present invention is a cursor control stick adapted to be manipulated by a user to move a cursor on a computer screen by applying lateral force to the cursor control stick in a direction of desired cursor movement, and which enables the user to select items on the computer screen at a position of the cursor by depressing a plunger on the cursor control stick. The cursor control stick includes a rigid tube having an outwardly tapering conical throughbore and horizontal protrusions at a base of the rigid tube, and a plunger having an outwardly tapering conical body shaped in correspondence with the throughbore of the rigid tube, the plunger containing an electrically-conductive tip at a bottom thereof, and the plunger being slidably fit inside the rigid tube and including a neck which extends beyond the rigid tube and which is adapted to be manipulated by the user. Also included in the cursor control stick are non-electrically-conductive biasing means disposed beneath and in contact with the plunger, the non-electrically-conductive biasing means having a hole positioned such that the electrically-conductive tip at the bottom of the plunger protrudes through the hole, pressure sensitive resistive material disposed beneath and in contact with the horizontal protrusions at the base of the rigid tube, and a base containing electrical circuitry which is disposed beneath both the electrically-conductive tip at the bottom of the plunger and the pressure sensitive resistive material. The plunger is manipulable by the user between a depressed position and an undepressed position such that in the undepressed position, the conical body of the plunger engages the conical throughbore of the rigid tube, and in the depressed position, the conical body of the plunger disengages the conical throughbore of the rigid tube as the plunger moves downwardly inside the rigid tube. In response to a lateral force applied to the plunger in the undepressed position, the horizontal protrusions at the base of the rigid tube deform the pressure sensitive resistive material to complete an electric circuit on the base which signals movement of the cursor on the computer screen. In the depressed position, the non-electrically-conductive biasing means is deformed so that the electrically-conductive tip at the bottom of the plunger contacts the base containing electrical circuitry and completes an electric circuit which signals selection of an item on the computer screen.

In addition to the foregoing advantages described above with respect to the first two aspects of the present invention, this aspect of the invention uses an electrically-conductive tip to complete an electrical circuit on the base. The electrically-conductive tip provides for increased accuracy in completing an electrical circuit on the base.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

First Embodiment

According to a first embodiment, the present invention is a cursor control stick adapted to be manipulated by a user to move a cursor on a computer screen by applying lateral force to the cursor control stick in a direction of desired cursor movement, and which enables the user to select items on the computer screen at a position of the cursor by depressing a plunger on the cursor control stick. The cursor control stick includes a rigid tube having an outwardly-tapering conical throughbore and horizontal protrusions at a base of the rigid tube, a plunger having an outwardly-tapering conical body shaped in correspondence with the throughbore of the rigid tube, the plunger being slidably fit inside the rigid tube and including a neck which extends beyond the rigid tube and which is adapted to be manipulated by the user, and electrically-conductive biasing means disposed beneath and in contact with the plunger. Also included in the cursor control stick are pressure-sensitive resistive material disposed beneath and in contact with the horizontal protrusions at the base of the rigid tube, and a base containing electrical circuitry which is disposed beneath both the electrically-conductive biasing means and the pressure-sensitive resistive material. The plunger is manipulable by the user between a depressed position and an undepressed position such that in the undepressed position, a conical body of the plunger engages the conical throughbore of the rigid tube, and in the depressed position, the conical body of the plunger disengages the conical throughbore of the rigid tube as the plunger moves downwardly inside the rigid tube. In response to a lateral force applied to the plunger in the undepressed position, the horizontal protrusions at the base of the rigid tube deform the pressure-sensitive resistive material to complete an electric circuit which signals movement of the cursor on the computer screen. In the depressed position, the electrically-conductive biasing means is deformed so that the electrically-conductive biasing means contacts the base containing electrical circuitry and completes an electric circuit which signals selection of an item on the computer screen. The cursor control stick is described in detail below with reference to FIG. 1.

Figure 1:
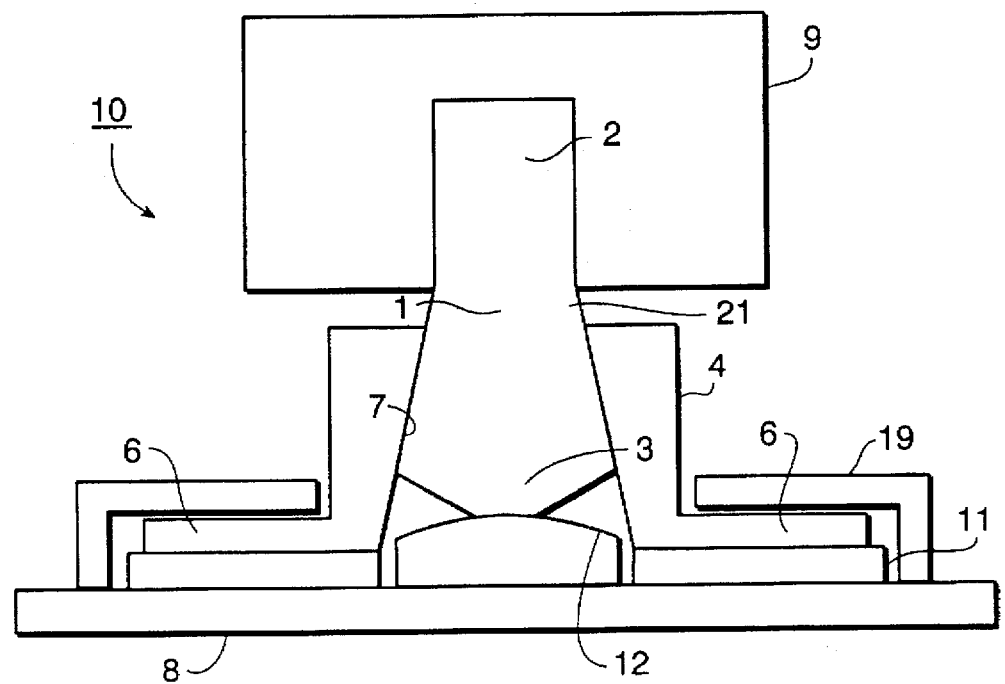
FIG. 1 shows an undepressed cursor control stick according to a first embodiment of the present invention.

FIG. 1 shows an undepressed cursor control stick according to a first embodiment of the present invention. As shown in FIG. 1, cursor control stick 10 includes the following components: plunger 1 having neck 2, body 3, and shoulder 21; head 9 fixed to neck 2; rigid tube 4 having horizontal protrusions 6 at its base and throughbore 7 at its center; dome spring 12 disposed beneath plunger 1; pressure-sensitive resistive material 11, the resistance of which lowers as force is applied thereto, disposed beneath horizontal protrusions 6; and base 8 containing electrical circuitry thereon disposed beneath both pressure-sensitive resistive material 11 and dome spring 12.

The electrical circuitry contained on base 8 includes oppositely-charged traces which correspond to open circuits. Base 8 is positioned such that these oppositely-charged traces are disposed beneath both pressure-sensitive resistive material 11 and dome spring 12.

As described above, the foregoing configuration permits a user to move a cursor on a computer screen and to select a cursor position on the computer screen. The function of moving a cursor on a computer screen will be described first with reference to FIG. 1.

As shown in FIG. 1, body 3 of plunger 1 has an outwardly-tapering conical shape, and throughbore 7 has a conical shape that corresponds to that of body 3. Accordingly, when plunger 1 is not depressed, at least an area of body 3 of plunger 1 engages an inner surface of throughbore 7. Since body 3 of plunger 1 engages an inner surface of throughbore 7, when lateral force is applied to plunger 1, the lateral force is transmitted from plunger 1 to rigid tube 4. The lateral force is then transmitted from rigid tube 4 to horizontal protrusions 6, and from horizontal protrusions 6 to pressure sensitive resistive material 11. As a result of the force applied from horizontal protrusions 6, pressure-sensitive resistive material 11 deforms.

In this regard, the more force that is applied to pressure-sensitive resistive material 11, the more that pressure-sensitive resistive material 11 deforms, and the lower the resistance becomes between the oppositely-charged traces on an electrical circuit disposed beneath pressure-sensitive resistive material 11. Thus, as the lateral force applied to plunger 1 increases, the resistance between the oppositely-charged traces decreases. This causes current traveling through the traces to increase, resulting in a completed electrical circuit.

Figure 5:
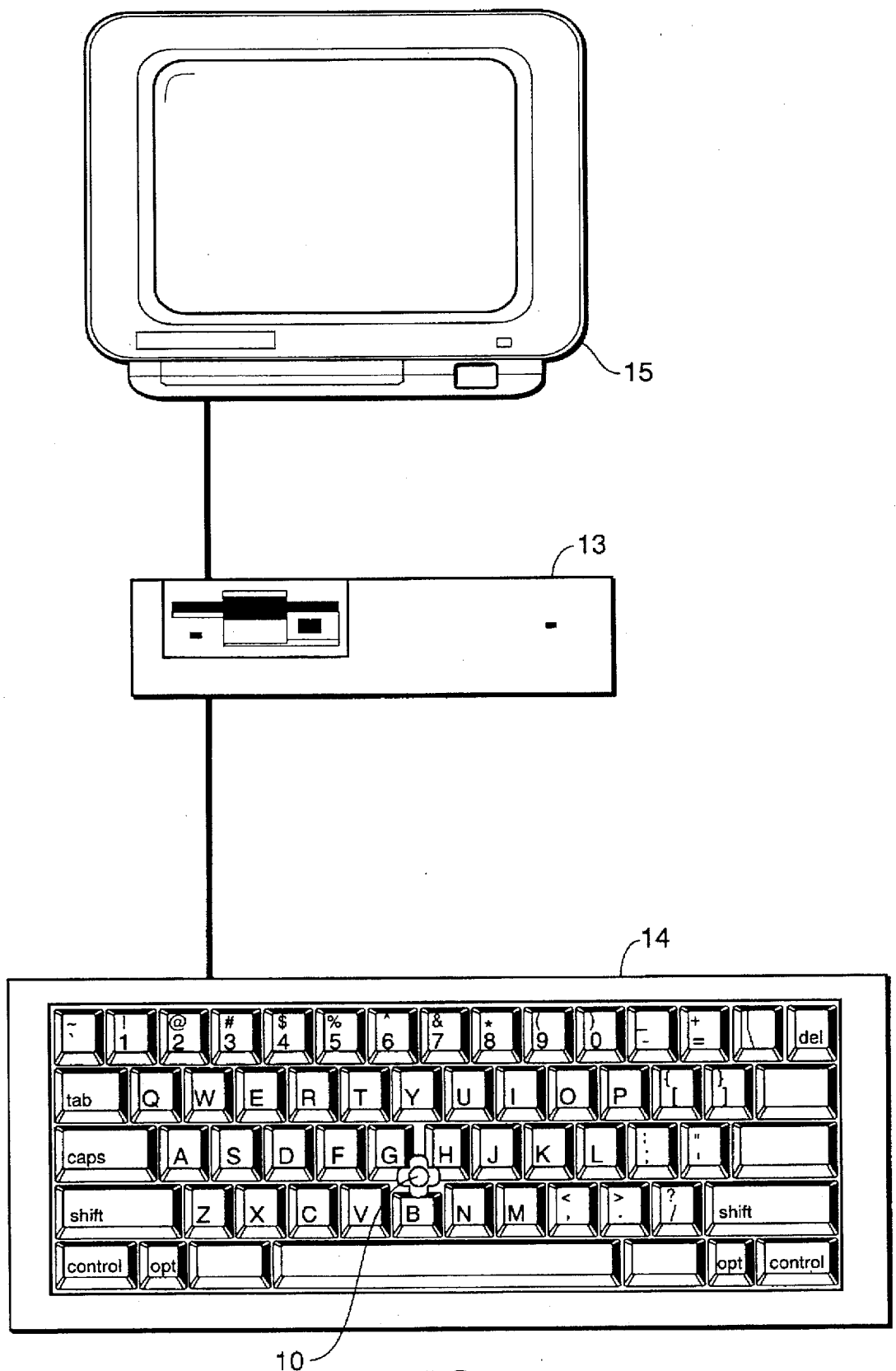
FIG. 5 shows a block diagram of a computer system which includes a cursor control stick according to the present invention.

When the circuit is completed, a signal is sent from the electrical circuit on base 8 to CPU 13, shown in FIG. 5. In response, CPU 13 moves a cursor on display 15 in the direction of the laterally-applied force. In this manner, the first embodiment converts laterally-applied force into cursor motion on a computer screen.

As indicated above, cursor control stick 10 also selects a point on a computer screen. This function of cursor control stick 10 is performed by depressing plunger 1, and is described below with reference to FIG. 2.

Figure 2:
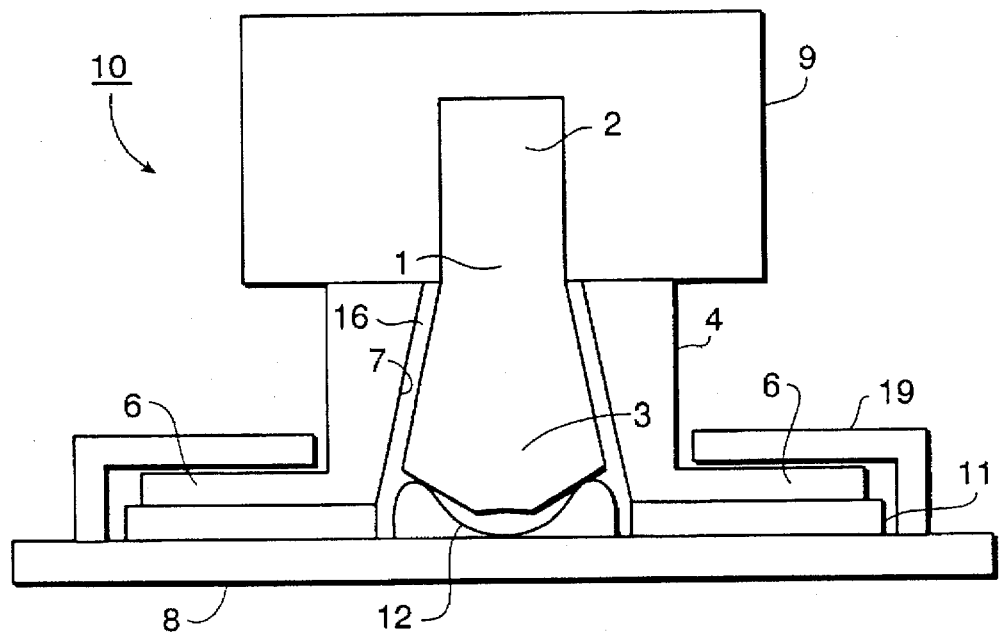
FIG. 2 shows a depressed cursor control stick according to a first embodiment of the present invention.

FIG. 2 shows plunger 1 of cursor control stick 10 in a depressed position. More specifically, FIG. 2 shows cursor control stick 10 after a downward force has been applied to head 9 atop plunger 1. As shown, upon application of a predetermined amount of downward force to head 9, head 9 engages rigid tube 4, body 3 of plunger 1 deforms dome spring 12, and dome spring 12 contacts base 8. As indicated above, an open electrical circuit is disposed beneath dome spring 12.

In a preferred embodiment of the present invention, dome spring 12 is made from electrically-conductive material, such as a metal alloy. Thus, when dome spring 12 contacts the electrical circuit on base 8, dome spring 12 completes the electrical circuit. The completed electrical circuit then sends a signal to CPU 13 which, in response to the signal, selects a specific point on display 15. Advantageously, CPU 13 performs the selection without creating either a space or a character.

If dome spring 12 is made from non-electrically-conductive material, such as plastic, dome spring 12 cannot be used to complete the electrical circuit on base 8.

Figure 3:
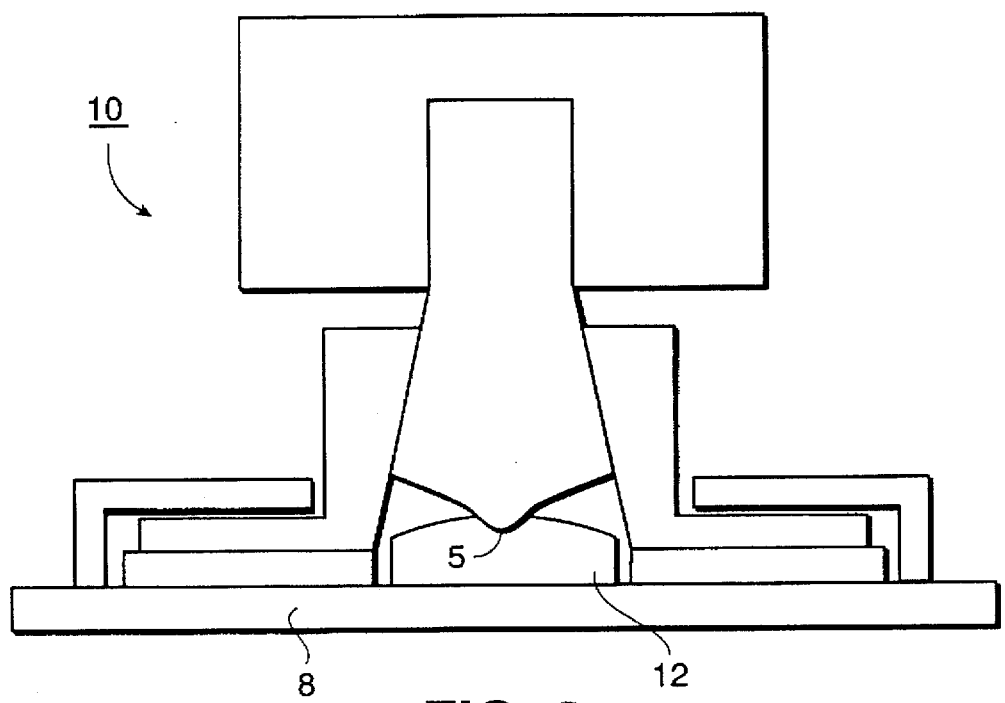
FIG. 3 shows an undepressed cursor control stick according to a first embodiment of the present invention, which includes an electrically-conductive tip fixed to a bottom of a plunger.
Figure 4:
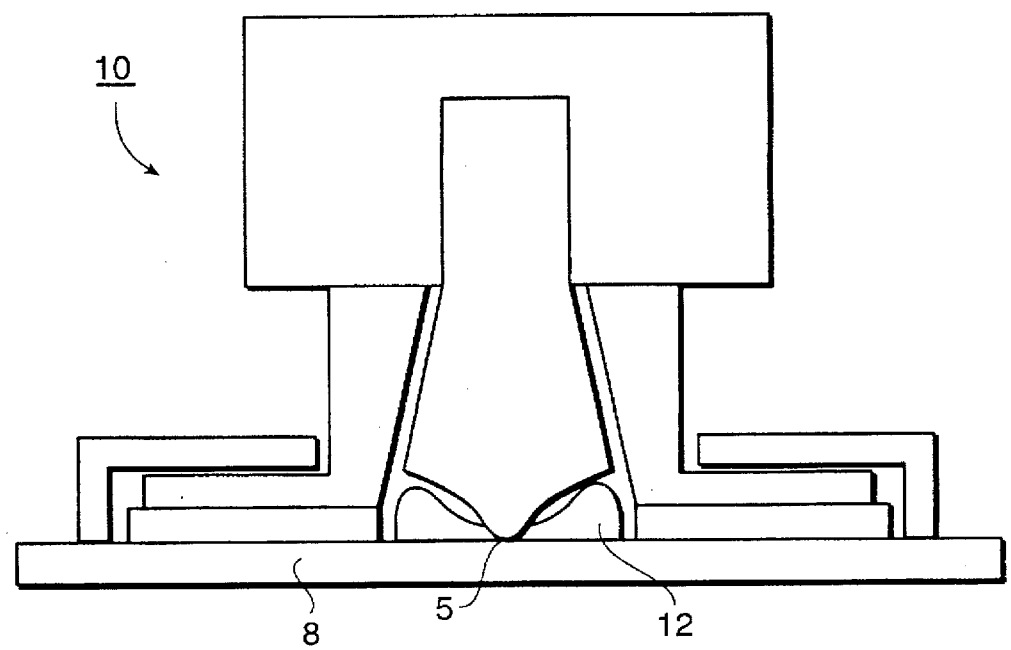
FIG. 4 shows a depressed cursor control stick according to a first embodiment of the present invention, which includes an electrically-conductive tip fixed to a bottom of a plunger.

Thus, according to a modification of the first embodiment, as shown in FIGS. 3 and 4, electrically-conductive tip 5 can be fixed to a bottom of body 3 of plunger 1, such that when plunger 1 is depressed (FIG. 4), electrically-conductive tip 5, rather than dome spring 12, contacts the electrical circuit on base 8. In this case, dome spring 12 must be fashioned so that, when dome spring 12 deforms, electrically-conductive tip 5 contacts base 8. One way to ensure that electrically-conductive tip 5 contacts base 8 when dome spring 12 deforms is to create a hole in dome spring 12, through which electrically-conductive tip 5 protrudes. However, any means can be used to ensure that electrically-conductive tip 5 contacts base 8 when dome spring 12 deforms.

It is noted that electrically-conductive tip 5 can also be used in a case where dome spring 12 is electrically conductive.

Advantageously, the first embodiment of the present invention also includes head 9. As shown in FIG. 2, head 9 contacts rigid tube 4 when a predetermined amount of downward force is applied to head 9. Thus, head 9 limits the amount of force that can be applied via plunger 1 to the electrical circuit contained on base 8. In this manner, head 9 protects the electrical circuitry contained on base 8 from being crushed by plunger 1. It should be noted, however, that head 9 need not included in the invention. In such a case, force can be applied directly to neck 2 of plunger 1.

It is a further advantage of the present invention that dome spring 12 makes an audible sound when depressed, thus indicating to the user when a point on a computer screen has been selected.

As indicated above, a function of cursor control stick 10 is to reduce cursor movement on a computer screen caused by lateral force inadvertently applied when plunger 1 is depressed. That is, as indicated above, when a user applies downward force to head 9 in order to select a specific position on a computer screen, the downward force often contains a lateral component. Since the cursor control stick of the present invention detects lateral force and moves a cursor on a computer screen in response to detected lateral force, the present invention must address the problem of unwanted cursor movement in response to the lateral component of the downward force.

FIG. 2 shows how the present invention addresses the foregoing problem. More specifically, as shown in FIG. 2, when downward force is applied to head 9, throughbore 7 and body 3 of plunger 1 disengage. This causes gap 16 to form between an inner surface of throughbore 7 and body 3 of plunger 1.

In this regard, it should be noted that since, in an undepressed position, shoulder 21 of body 3 sticks out of a top of rigid tube 4, gap 16 extends along an entire length of body 3 when plunger 1 is depressed. Thus, in a depressed position, body 3 of plunger 1 does not engage an inner surface of throughbore 7 at any point, in the absence of laterally-applied force.

If lateral force is applied when plunger 1 is depressed, body 3 of plunger 1 will move laterally, for a predetermined distance, inside of gap 16 before contacting an inner surface of throughbore 7. Thus, for that predetermined distance, no lateral force is transmitted from plunger 1 to rigid tube 4, and thus no lateral force is transmitted to pressure-sensitive resistive material 11. Accordingly, no lateral motion of the cursor on the screen is produced. In this manner, cursor motion on the computer screen during cursor selecting is reduced.

In sum, gap 16 acts to absorb a predetermined amount of lateral movement applied to plunger 1 when plunger 1 is depressed, thus reducing lateral movement of the cursor when plunger 1 is depressed.

The maximum dimensions of gap 16 are determined according to the dimensions of body 3 of plunger 1 and throughbore 7. Preferably, the maximum dimensions of gap 16 are large enough so that gap 16 can absorb inadvertently-applied lateral force, and small enough so that gap 16 does not interfere with dome spring 11 (or electrically-conductive tip 5) contacting base 8.

More specifically, if gap 16 is too small, it will absorb relatively little laterally-applied force when plunger 1 is depressed. On the other hand, if gap 16 is too large, then body 3 could be tilted inside of throughbore 7 such that dome spring 12 (or electrically-conductive tip 5) is unable to contact base 8, or such that dome spring 12 (or electrically-conductive tip 5) incorrectly contacts base 8.

Thus, several factors should be taken into account when determining the size of gap 16. These include, but are not limited to, the dimensions of the electrical circuitry on base 8 and the amount of lateral force that is to be absorbed.

As noted above, when plunger 1 is not depressed, the present invention does not reduce the effects of laterally applied force, since to do so would reduce the ability of the invention to move the cursor on the computer screen. Therefore, a majority of gap 16 is not formed when plunger 1 is in an undepressed position.

More specifically, as shown in FIG. 1 and as discussed above, when plunger 1 is in an undepressed position, an area of body 3 of plunger 1 contacts an inner surface of throughbore 7, thereby minimizing gap 16. As a result, in an undepressed position, the cursor control stick of the present invention is sensitive to laterally-applied force.

It should be noted that it is not necessary to totally eliminate gap 16 in order for the first embodiment of the present invention to function properly in an undepressed position. Rather, gap 16 need merely be made small enough so as to ensure that cursor control stick 10 is sensitive to laterally-applied forces.

The foregoing first embodiment of the present invention also includes shaft holder 19, shown in FIG. 1. Shaft holder 19 holds in place, on base 8, horizontal protrusions 6, pressure-sensitive resistive material 11, and rigid tube 4. Additionally, shaft holder 19 protects horizontal protrusions 6, pressure-sensitive resistive material 11 and base 8 from dust and debris. In this manner, shaft holder 19 reduces wear on those components caused by dirt buildup, thereby increasing the accuracy and the longevity of the cursor control stick.

Second Embodiment

According to a second embodiment, the present invention is a cursor control stick adapted to be manipulated by a user to move a cursor on a computer screen by applying lateral force to the cursor control stick in a direction of desired cursor movement, and which enables the user to select items on the computer screen at a position of the cursor by depressing a plunger on the cursor control stick. The cursor control stick includes a rigid tube having an outwardly-tapering conical throughbore, a plunger having an outwardly-tapering conical body shaped in correspondence with the throughbore of the rigid tube, the plunger being slidably fit inside the rigid tube and including a neck which extends beyond the rigid tube and which is adapted to be manipulated by the user, and electrically-conductive biasing means disposed beneath and in contact with the plunger. Also included in the cursor control stick are strain gauges disposed radially around and in contact with the rigid tube, and a base containing electrical circuitry disposed beneath the electrically-conductive biasing means and radially around and in contact with the strain gauges. The plunger is manipulable by the user between a depressed position and an undepressed position such that in the undepressed position the conical body of the plunger engages the conical throughbore of the rigid tube, and in the depressed position the conical body of the plunger disengages the conical throughbore of the rigid tube as the plunger moves downwardly inside the rigid tube. In response to a lateral force applied to the plunger in the undepressed position, the lateral force is transferred from the plunger to the strain gauges which forcibly strain to complete an electrical circuit on the base containing electrical circuitry, thereby signalling movement of the cursor on the computer screen. In the depressed position, the electrically-conductive biasing means is deformed so that the electrically-conductive biasing means contacts the base containing electrical circuitry and complete an electrical circuit which signals selection of an item on the computer screen.

Figure 6:
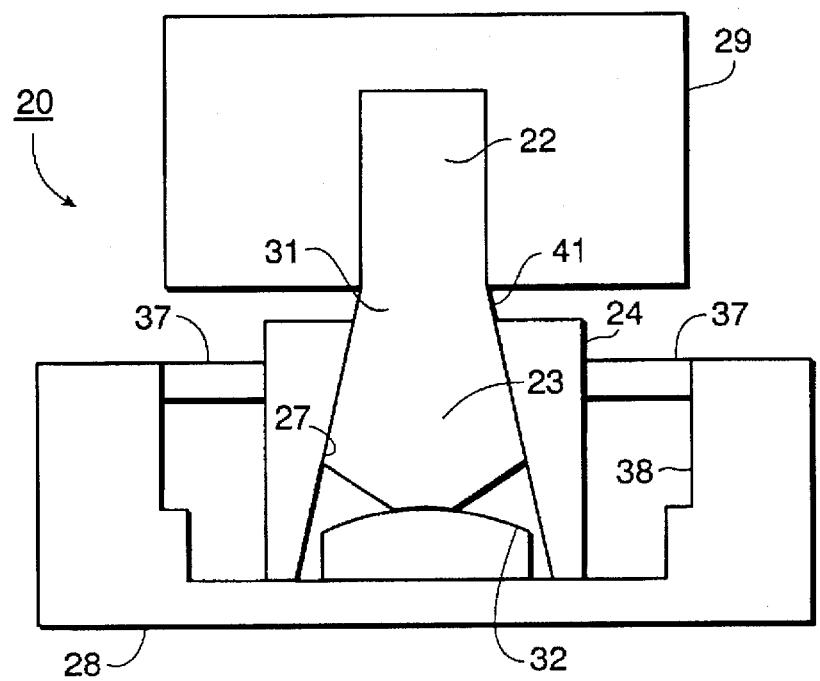
FIG. 6 shows an undepressed cursor control stick according to a second embodiment of the present invention.
Figure 7:
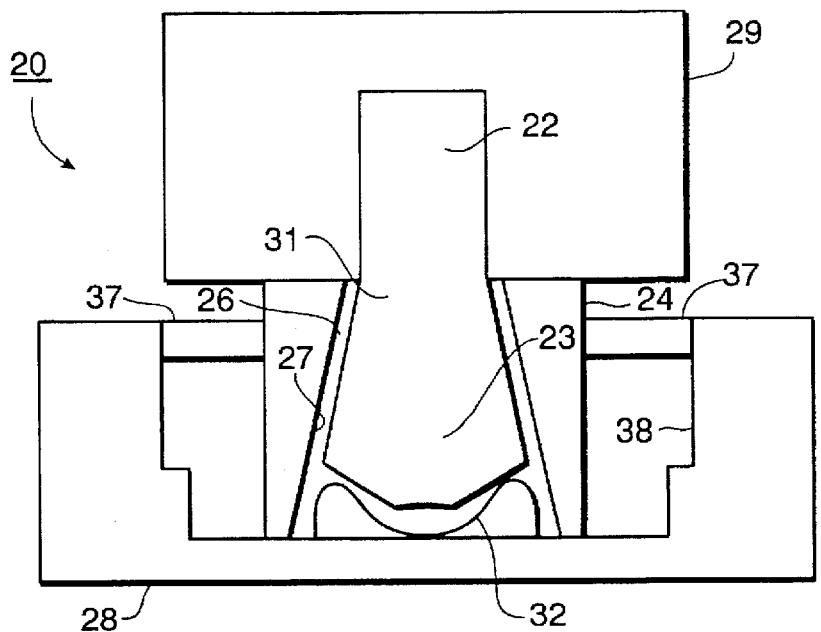
FIG. 7 shows a depressed cursor control stick according to a second embodiment of the present invention.

FIGS. 6 and 7 show a second embodiment of the cursor control stick of the present invention. FIG. 6 shows cursor control stick 20 in an undepressed position, and FIG. 7 shows cursor control stick 20 in a depressed position. Components of the second embodiment of the present invention that are similar to those described in the first embodiment are similarly named. In this regard, all features, advantages and functions of the similar components, described above with respect to the first embodiment, are hereby incorporated by reference into the second embodiment.

As shown in FIG. 6, the second embodiment of the present invention includes the following features in common with the first embodiment: plunger 31 comprised of neck 22, body 23 and shoulder 41; rigid tube 24 having throughbore 27; base 28; head 29; and dome spring 32. In addition, however, the second embodiment of the present invention includes strain gauges 37 disposed radially around and in contact with rigid tube 24, and sidepanels 38, which are a part of base 28, which contain electrical circuitry mounted thereon, and which are disposed radially around and in contact with strain gauges 37.

As was the case with respect to the first embodiment, body 23 of plunger 31 is conically shaped, and throughbore 27 of rigid tube 24 is correspondingly conically shaped such that an area of body 23 engages an inner surface of throughbore 27 when plunger 31 is not depressed. However, unlike the first embodiment, the second embodiment relies on strain gauges 37, rather than on pressure-sensitive resistive material, to convert force laterally applied to plunger 31 into cursor movement on a computer screen.

More specifically, according to the second embodiment, strain gauges 37 are disposed radially between and in contact with both rigid tube 24 and open electrical circuitry mounted on sidepanels 38 of base 28. Thus, when plunger 31 is in an undepressed position, as shown in FIG. 6, and when lateral force is applied to plunger 31, the lateral force is transferred to rigid tube 24 and then to strain gauges 37. The lateral force transferred to strain gauges 37 deforms strain gauges 37, thereby decreasing a resistance of strain gauges 37. This completes an electrical circuit mounted on sidepanels 38 in contact with strain gauges 37. The completed electrical circuit sends a signal to a CPU which, in response to the signal, moves a cursor on a display in the direction of the laterally-applied force. In this manner, strain gauges 37 are used to control cursor movement on a computer display screen.

FIG. 7 shows the second embodiment with plunger 31 in a depressed position, i.e., when a downward force has been applied to head 29 of plunger 31 to select a specific point on a computer screen. As was the case with respect to the first embodiment, when a predetermined amount of downward force is applied to head 29, body 23 of plunger 31 slidably moves downward along throughbore 27 to deform electrically-conductive dome spring 32, thereby forcing dome spring 32 to contact base 28. This results in an electrical circuit being completed in a case where dome spring 32 is made of electrically-conductive material. The completed electrical circuit sends a signal to a CPU which, in response to the signal, selects a position on a display.

Figure 8:
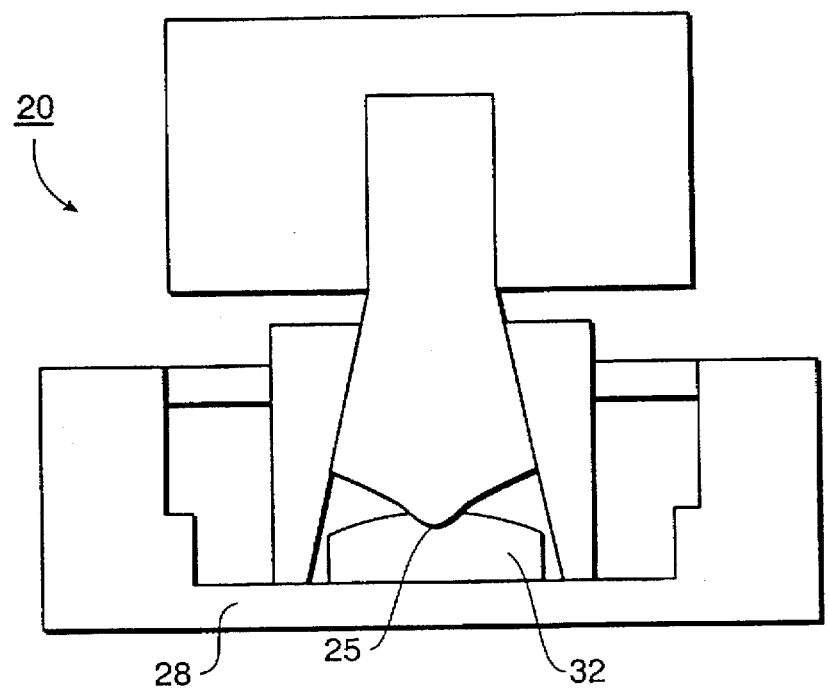
FIG. 8 shows an undepressed cursor control stick according to a second embodiment of the present invention, which includes an electrically-conductive tip fixed to a bottom of a plunger.
Figure 9:
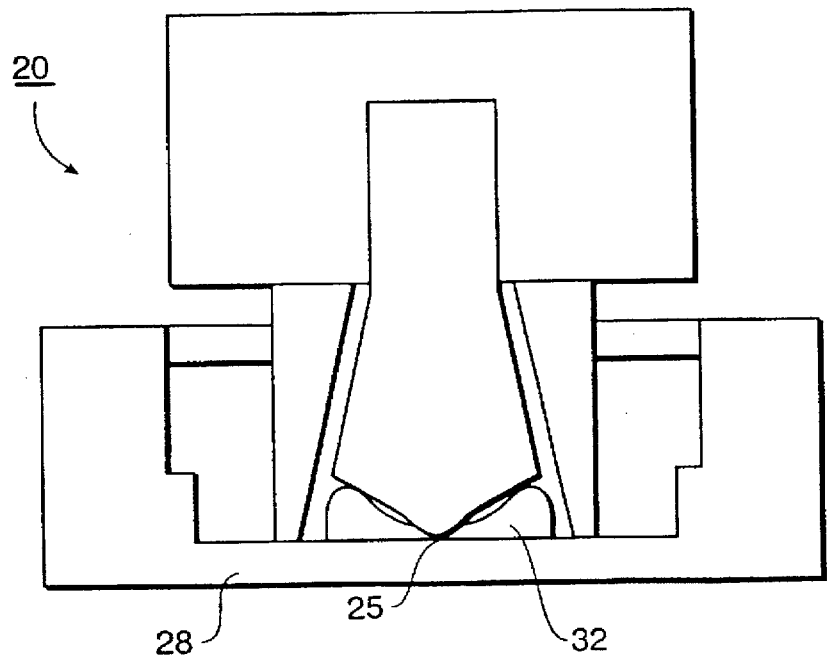
FIG. 9 shows a depressed cursor control stick according to a second embodiment of the present invention, which includes an electrically-conductive tip fixed to a bottom of a plunger.

FIGS. 8 and 9 show plunger 1 of cursor control stick 20 in undepressed and depressed positions, respectively. In these figures, electrically-conductive tip 25, rather than dome spring 32, contacts base 28. As was the case with respect to the first embodiment, this configuration need only be used in a case where dome spring 32 is not electrically-conductive. The operation of electrically-conductive tip 25, which is identical to electrically-conductive tip 5 described in the first embodiment, is the same as that discussed above with respect to the first embodiment shown in FIGS. 3 and 4. All features and advantages of electrically-conductive tip 5 are hereby incorporated by reference into the second embodiment.

The second embodiment of the present invention reduces the effects of inadvertently-applied lateral force in a manner similar to the first embodiment. More specifically, as was the case with respect to the first embodiment, when body 23 of plunger 31 moves slidably down throughbore 27, body 23 disengages from throughbore 27, thereby creating gap 26. With respect to gap 26, the second embodiment functions much the same as the first embodiment. That is, gap 26 acts to absorb lateral force applied inadvertently when plunger 31 is depressed. Accordingly, all of the advantages and features resulting from the creation of gap 26 are hereby incorporated by reference from the first embodiment into the second embodiment.

In preferred embodiments of the present invention, the base is comprised of a printed circuit board. However, the present invention is not limited to using a printed circuit board as its base. Rather, any sufficiently-mounted electrical circuitry will suffice, so long as it acts in correspondence with the above-described strain gauges and pressure sensitive resistive material.

In addition, preferably, the cursor control stick of the present invention is mounted on a computer keyboard such that a user can easily access the cursor control stick from a normal typing position. For example, the cursor control stick could be mounted between the "G", "H" and "B" keys. This mounting configuration is preferred for at least two reasons. First, this configuration positions the cursor control stick near the home typing row, which would make the cursor control stick easily accessible by a typist's forefinger. Second, since conventional eraserheads are mounted in this position, an eraserhead user could operate the cursor control stick in the same manner as a conventional eraserhead.

In this regard, FIG. 5 shows an example of a preferred mounting of cursor control stick 10 on computer keyboard 14. It should be noted, however, that the cursor control stick of the present invention need not be mounted on a computer keyboard. For example, the cursor control stick could be mounted on a side of a computer keyboard or below a spacebar of a computer keyboard.

In a case where the cursor control stick is mounted on a computer keyboard, preferably a base for the cursor control stick also functions as a circuit base, such as a keyboard membrane, for keys on the computer keyboard. That is, in addition to containing circuitry for moving the cursor on a computer screen and for selecting a specific position on the computer screen, the base also contains circuitry for transmitting signals in response to keystrokes to generate characters for display on the computer screen. However, as was the case above, this is not a requirement of the present invention. That is, separate bases for the cursor control stick of the present invention and the keyboard can be used, regardless of whether the cursor control stick is mounted on the keyboard.

The present invention is also not limited to using plungers having conically-shaped bodies and conically-shaped throughbores. Rather, any shaped plunger and correspondingly shaped throughbore which produce a gap, similar to above-described gaps 16 and 26, when the plunger is depressed, can be used. To create such a gap, any shape which continuously outwardly tapers could be used for the throughbore and the body of the plunger. In this regard, other examples of acceptable shapes for the throughbore and the plunger include parabolic shapes and pyramidal shapes.

It is further noted that the cursor control stick of the present invention is not limited to using a dome spring as a biasing means. Rather, any type of deformable device or material may be used as a biasing means, provided that its function is substantially equivalent to that of dome spring 12.

The invention has been described with respect to particular illustrative embodiments. It is to be understood that the invention is not limited to the above described embodiments and that various changes and modifications may be made by those of ordinary skill in the art without departing from the spirit and scope of the invention.

What is claimed is:

1. A cursor control stick adapted to be manipulated by a user to move a cursor on a computer screen by applying lateral force to the cursor control stick in a direction of desired cursor movement, and which enables the user to select items on the computer screen at a position of the cursor by depressing a plunger on the cursor control stick, said cursor control stick comprising:

a rigid tube having an outwardly-tapering conical throughbore and horizontal protrusions at a base of said rigid tube;

a plunger having an outwardly-tapering conical body shaped in correspondence with the throughbore of said rigid tube, said plunger being slidably fit inside said rigid tube and including a neck which extends beyond said rigid tube and which is adapted to be manipulated by the user;

electrically-conductive biasing means disposed beneath and in contact with said plunger;

pressure-sensitive resistive material disposed beneath and in contact with the horizontal protrusions at the base of said rigid tube; and a base containing electrical circuitry which is disposed beneath both said electrically-conductive biasing means and said pressure-sensitive resistive material;

wherein said plunger is manipulable by the user between a depressed position and an undepressed position such that in the undepressed position the conical body of said plunger engages the conical throughbore of said rigid tube, and in the depressed position the conical body of said plunger disengages the conical throughbore of said rigid tube as said plunger moves downwardly inside said rigid tube;

wherein in response to a lateral force applied to said plunger in the undepressed position, the horizontal protrusions at the base of said rigid tube deform said pressure-sensitive resistive material to complete an electric circuit on said base which signals movement of the cursor on the computer screen; and wherein in the depressed position said electrically-conductive biasing means is deformed so that said electrically-conductive biasing means contacts said base containing electrical circuitry and completes an electric circuit which signals selection of an item on the computer screen.

2. A cursor control stick according to claim 1, wherein said cursor control stick is mounted on a computer keyboard, and wherein said base comprises a printed circuit board which also defines a base for the computer keyboard.

3. A cursor control stick according to claim 2, wherein said base contains electrical circuitry which controls keys on said computer keyboard, and wherein said cursor control stick is positioned on said base so as to prevent formation of a character when said plunger is depressed.

4. A cursor control stick according to claim 1, further comprising a head fixed to the neck of said plunger, said head restricting motion of said plunger along the throughbore of said rigid tube by contacting said rigid tube when said plunger is depressed a predetermined distance.

5. A cursor control stick adapted to be manipulated by a user to move a cursor on a computer screen by applying lateral force to the cursor control stick in a direction of desired cursor movement, and which enables the user to select items on the computer screen at a position of the cursor by depressing a plunger on the cursor control stick, the cursor control stick comprising:

a rigid tube having an outwardly-tapering conical throughbore and horizontal protrusions at a base of the rigid tube;

a plunger having an outwardly-tapering conical body shaped in correspondence with the throughbore of the rigid tube, the plunger being slidably fit inside the rigid tube and including a neck which extends beyond the rigid tube and which is adapted to be manipulated by the user;

biasing means disposed beneath and in contact with the plunger;

pressure-sensitive resistive material disposed beneath and in contact with the horizontal protrusions at the base of the fluid tube; and a base containing electrical circuitry which is disposed beneath both the biasing means and the pressure-sensitive resistive material;

wherein the plunger is manipulable by the user between a depressed position and an undepressed position such that in the undepressed position the conical body of the plunger engages the conical throughbore of the rigid tube, and in the depressed position the conical body of the plunger disengages the conical throughbore of the rigid tube as the plunger moves downwardly inside the rigid tube;

wherein in response to a lateral force applied to the plunger in the undepressed position, the horizontal protrusion at the base of the rigid tube deform the pressure-sensitive resistive material to complete an electric circuit of the base which signals movement of the cursor on the completer screen; and wherein a bottom of said plunger contains an electrically-conductive tip, and wherein said biasing means contains a hole which permits the electrically-conductive tip to protrude therefrom and contact an electrical circuit on said base when said biasing means is deformed by said plunger.

6. A cursor control stick adapted to be manipulated by a user to move a cursor on a computer screen by applying lateral force to the cursor control stick in a direction of desired cursor movement, and which enables the user to select items on the computer screen at a position of the cursor by depressing a plunger on the cursor control stick, said cursor control stick comprising:

a rigid tube having an outwardly-tapering conical throughbore;

a plunger having an outwardly-tapering conical body shaped in correspondence with the throughbore of said rigid tube, said plunger being slidably fit inside said rigid tube and including a neck which extends beyond said rigid tube and which is adapted to be manipulated by the user;

electrically-conductive biasing means disposed beneath and in contact with said plunger;

strain gauges disposed radially around and in contact with said rigid tube; and a base containing electrical circuitry disposed beneath said electrically-conductive biasing means and radially around and in contact with said strain gauges;

wherein said plunger is manipulable by the user between a depressed position and an undepressed position such that in the undepressed position the conical body of said plunger engages the conical throughbore of said rigid tube, and in the depressed position the conical body of said plunger disengages the conical throughbore of said rigid tube as said plunger moves downwardly inside said rigid tube;

wherein in response to a lateral force applied to said plunger in the undepressed position, the lateral force is transferred from said plunger to said strain gauges which forcibly strain to complete an electrical circuit on said base containing electrical circuitry, thereby signalling movement of the cursor on the computer screen; and wherein in the depressed position said electrically-conductive biasing means is deformed so that said electrically-conductive biasing means contacts said base containing electrical circuitry and completes an electric circuit on said base which signals selection of an item on the computer screen.

7. A cursor control stick according to claim 6, wherein said cursor control stick is mounted on a computer keyboard, and wherein said base comprises a printed circuit board which also defines a base for the computer keyboard.

8. A cursor control stick according to claim 7, wherein said base contains electrical circuitry which controls keys on said computer keyboard, and wherein said cursor control stick is positioned on said base so as to prevent formation of a character when said plunger is depressed.

9. A cursor control stick according to claim 6, further comprising a head fixed to the neck of said plunger, said head restricting motion of said plunger along the throughbore of said rigid tube by contacting said rigid tube when said plunger is depressed a predetermined distance.

10. A cursor control stick adapted to be manipulated by a user to move a cursor on a computer screen by applying lateral force to the cursor control stick in a direction of desired cursor movement, and which enables the user to select items on the computer screen at a position of the cursor by depressing a plunger on the cursor control stick, the cursor control stick comprising:

a rigid tube having an outwardly-tapering conical throughbore;

a plunger having an outwardly-tapering conical body shaped in correspondence with the throughbore of the rigid tube, the plunger being slidably fit inside the rigid tube and including a neck which extends beyond the rigid tube and which is adapted to be manipulated by the user;

biasing means disposed beneath and in contact with the plunger;

strain gauges disposed radially around and in contact with the rigid tube; and a base containing electrical circuit disposed beneath the biasing means and radially around and in contact with the strain gauges;

wherein the plunger is manipulable by the user between a depressed position and an undepressed position such that in the undepressed position the conical body of the plunger engages the conical throughbore of the rigid tube, and in the depressed position the conical body of the plunger disengages the conical throughbore of the rigid tube as the plunger moves downwardly inside the rigid tube;

wherein in response to a later force applied to the plunger in the undepressed position, the lateral force is transferred from the plunger to the strain gauges which forcibly strain to complete an electrical circuit on the base containing electrical circuitry, thereby signalling movement of the cursor on the computer screen; and wherein a bottom of said plunger contains an electrically-conductive tip, and wherein the biasing means contains a hole which permits said electrically-conductive tip to protrude therefrom and contact an electrical circuit on said base when said biasing means is deformed by said plunger.

11. A cursor control stick adapted to be manipulated by a user to move a cursor on a computer screen by applying lateral force to the cursor control stick in a direction of desired cursor movement, and which enables the user to select items on the computer screen at a position of the cursor by depressing a plunger on the cursor control stick, said cursor control stick comprising:

a rigid tube having an outwardly-tapering conical throughbore and horizontal protrusions at a base of said rigid tube;

a plunger having an outwardly-tapering conical body shaped in correspondence with the throughbore of said rigid tube, said plunger containing an electrically-conductive tip at a bottom thereof, and said plunger being slidably fit inside said rigid tube and including a neck which extends beyond said rigid tube and which is adapted to be manipulated by the user;

non-electrically-conductive biasing means disposed beneath and in contact with said plunger, said non-electrically-conductive biasing means having a hole positioned such that the electrically-conductive tip at the bottom of said plunger protrudes through the hole;

pressure-sensitive resistive material disposed beneath and in contact with the horizontal protrusions at the base of said rigid tube; and a base containing electrical circuitry which is disposed beneath both the electrically-conductive tip at the bottom of said plunger and said pressure-sensitive resistive material;

wherein said plunger is manipulable by the user between a depressed position and an undepressed position such that in the undepressed position the conical body of said plunger engages the conical throughbore of said rigid tube, and in the depressed position the conical body of said plunger disengages the conical throughbore of said rigid tube as said plunger moves downwardly inside said rigid tube;

wherein in response to a lateral force applied to said plunger in the undepressed position, the horizontal protrusions at the base of said rigid tube deform said pressure-sensitive resistive material to complete an electric circuit on said base which signals movement of the cursor on the computer screen; and wherein in the depressed position said non-electrically-conductive biasing means is deformed so that the electrically-conductive tip at the bottom of said plunger contacts said base containing electrical circuitry and completes an electric circuit which signals selection of an item on the computer screen.

\* \* \* \* \*

UNITED STATES PATENT AND TRADEMARK OFFICE
CERTIFICATE OF CORRECTION

PATENT NO. : 5,712,660

DATED : January 27, 1998

INVENTOR(S) : Michael M. Martin

It is certified that error appears in the above-identified patent and that said Letters Patent is hereby corrected as shown below:

```
        Claim 5, column 12, line 32, change "protrusion"
to --protrusions--; and
             line 35, change "completer" to
--computer--.

Claim 10, column 13, line 53, change "circuit" to
--circuitry--; and
             column 14, line 1, change "later" to
--lateral--.
```

Signed and Sealed this

Twenty-second Day of September, 1998

Attest:

BRUCE LEHMAN

Attesting Officer

Commissioner of Patents and Trademarks